United States Patent [19]
Kasugai et al.

[11] 3,811,913
[45] May 21, 1974

[54] METHOD FOR PREPARING A SUPPORT FOR A PHOTOGRAPHIC LIGHT-SENSITIVE MATERIAL

[75] Inventors: Tsuneo Kasugai; Nobuhiko Minagawa, both of Shizuoka, Japan

[73] Assignee: Fuji Photo Film Co., Ltd., Kanagawa, Japan

[22] Filed: Aug. 13, 1970

[21] Appl. No.: 63,376

[30] Foreign Application Priority Data
Aug. 12, 1969 Japan.............................. 44-64038

[52] U.S. Cl................... 117/34, 117/47 A, 96/87 R
[51] Int. Cl............................................. C03c 1/78
[58] Field of Search....... 96/87; 117/15, 47 A, 33.5, 117/34

[56] References Cited
UNITED STATES PATENTS

| | | | |
|---|---|---|---|
| 3,454,424 | 7/1969 | Schneider | 96/87 |
| 3,434,840 | 3/1969 | Keyser et al. | 96/87 |
| 3,475,193 | 10/1969 | Takewaka et al. | 117/47 |
| 3,411,910 | 11/1968 | Crawford et al. | 96/87 |
| 3,475,173 | 10/1969 | Kimura et al. | 96/87 |
| 3,565,624 | 2/1971 | Uffindell | 96/87 |
| 3,134,684 | 5/1964 | Northrop et al. | 117/15 |

FOREIGN PATENTS OR APPLICATIONS
1,259,427    0/1961    France

OTHER PUBLICATIONS

Kudrna, "Making Surfaces of Cellulose Derivative Films Hydrophilic," Chem. Abstracts, Vol. 69, 1968, 78576m.

*Primary Examiner*—J. Travis Brown
*Assistant Examiner*—Edward C. Kimlin
*Attorney, Agent, or Firm*—Sughrue, Rothwell, Mion, Zinn and Macpeak

[57] ABSTRACT

A method for preparing a support for a photographic light-sensitive material comprising applying a subbing solution to a photographic light-sensitive emulsion coating surface of a member selected from the group consisting of a polyethylene film and a polyethylene coated paper, said subbing solution being a solution or a dispersion of a member selected from the group consisting of a gelatin and a maleic anhydride copolymer and having a surface tension at 35°C ranging from 23 dyn/cm to 50 dyn/cm and applying ultraviolet radiation to the thus prepared surface, is disclosed.

15 Claims, 3 Drawing Figures

METHOD FOR PREPARING A SUPPORT FOR A PHOTOGRAPHIC LIGHT-SENSITIVE MATERIAL

BACKGROUND OF THE INVENTION

1. Field of the Invention

This invention relates to a method for preparing a photographic light-sensitive material comprising a polyethylene film or polyethylene coated paper as a support, and especially to a method for preparing a subbing layer.

2. Description of the Prior Art

Hitherto, when using a support composed of a cellulose acetate or a linear polyester, a subbing layer was prepared by applying a solution or a dispersion of a resin, having an adhesive property to the photographic emulsion (which is described hereinafter as the subbing resin) in which the solvent dissolves or swells the surface of the support to cause adhesion between the support and the photographic emulsion layer.

However, when polyethylene is used as a support for a photographic light-sensitive material, sufficient adhesive strength between the subbing layer and the support cannot be obtained with the prior method, because no solvent was suitable for swelling or dissolving the surface of the chemically inert polyethylene support.

Electrical discharge treatments, flame treatments and chemical oxidation treatments by such as chromic acid are commonly used to activate the polyethylene surface. However, these methods have the following disadvantages when used as the method of treating the surface of photographic supports. In the electrical discharge treatment and the flame activating treatment, the activated layer formed on the surface of the support falls off the support on wearing and the like before the application of the photographic emulsion layer or the subbing layer and the effect of the surface treatment is lost partially or completely. This is because the activated layer formed on the surface of the polyethylene support has a comparatively small thickness and an insufficient mechanical strength. Further, in the flame treatment there are many disadvantages such as the danger in using the flame or non-uniformity of the effect of treating due to the variation in the flame intensity. The chromic acid treatment is unsuitable for the continuous treatment of a photographic support because not only is a long treatment period required, but also washing with water and drying after treatment is necessary.

An object of the method of this invention is to improve the adhesive property of the polyethylene support to the subbing layer by application of ultraviolet rays to the surface of the polyethylene support.

SUMMARY OF THE INVENTION

This invention relates to a method for providing a subbing layer of a photographic light-sensitive material which comprises coating a solution or dispersion of gelatin on a copolymer comprising maleic anhydride as one component and applying ultraviolet rays to the coated surface.

DESCRIPTION OF THE INVENTION

According to the method of this invention, it is possible to shorten markedly the period of irradiation necessary to obtain the desired adhesive strength than is the case in which ultraviolet irradiation is applied directly to the surface of the polyethylene support before coating with a subbing layer. The period of irradiation with ultraviolet rays is less than one-tenth of that used in which the subbing layer is provided after exposing the surface of the polyethylene support to ultraviolet irradiation directly. In general, the period of irradiation of the ultraviolet ray is less than 1 minute. However, this depends on the conditions of irradiation.

The subbing resin used in this invention is intended to encompass gelatin or copolymers comprising maleic anhydride as one component. In the latter case, the other components of the copolymer can include, for example, ethyl acrylate, methacrylamide, vinyl acetate, vinyl propionate, vinyl benzoate, vinyl methyl ether, vinyl butyl ether, styrene, ethylene dichloride and homologs of the above-mentioned compounds. These copolymers have a molecular weight in the range of from approximately 8,000 to 1,000,000 and a range of from 10,00 to 100,000 is preferably used. The molar polymerization ratio of the maleic anhydride and the other monomer is about 1:1. The solvent used for the subbing solution must be transparent to a part of the ultraviolet radiation during the irradiation with the ultraviolet ray. Such solvents include, for example, water, methanol, ethanol, acetone and tetrahydrofuran. The ultraviolet irradiation is carried out either before or after drying the coated layer obtained by applying a solution or a dispersion prepared from the above-mentioned materials to a support.

In the method of this invention, the surface tension of the subbing solution should be in the range of from 23 dynes/cm to 50 dynes/cm at 35°C, as measured by du Neüy's method, to obtain sufficient adhesive strength and to satisfy wetting of the surface of the polyethylene support. In the following, du Neüy's method is explained in detail.

A platinum ring touching the surface of the liquid (for example, the subbing solution) is pulled up slowly. At the moment when the ring parts from the surface of the liquid, the force due to the surface tension, $\gamma$, of the liquid acts downwardly, and this is balanced by the pulling up force, $F$. This balance is represented by the following formula: $F = 4\pi R\gamma$, wherein $R$ represents the radius of the ring (generally about 0.64 cm). Accordingly, if the force $F$ is measured using a torsion balance or other suitable means, $\gamma$ can be obtained using the above-mentioned formula.

Adjustment of the surface tension of the subbing solution to the range of from 23 dyn/cm to 50 dyn/cm is necessary.

Table 1 shows the relationship between the surface tension (dyn/cm) of an aqueous gelatinous solution and the concentration (percent by weight) of the gelatin in the solution.

Table 1

| Surface Tension Measured at 35°C. | |
|---|---|
| Concentration (% by weight) | Surface Tension (dyn/cm) |
| 0 | 70 |
| 0.1 | 65 |
| 1.0 | 56 |
| 2.0 | 54 |
| 5.0 | 50 |

Table 2 shows the relationship between the surface tension (dyn/cm of a water/methanol solution of a vinyl acetate-maleic anhydride copolymer (molecular weight $2 \times 10^4$) (water:methanol = 2 : 8) and the concentration (percent by weight) of the copolymer in the solution.

Table 2

| Surface Tension Measured at 35°C. | |
|---|---|
| Concentration (% by weight) | Surface Tension (dyn/cm) |
| 0 | 25 |
| 0.1 | 25 |
| 1.0 | 25 |
| 5.0 | 25 |

Table 3 shows the relationship between the surface tension (dyn/cm) of a methanol solution of a vinyl acetate-maleic anhydride copolymer (molecular weight $2 \times 10^4$) and the concentration of the copolymer in the solution.

Table 3

| Surface Tension Measured at 35°C. | |
|---|---|
| Concentration (% by weight) | Surface Tension (dyn/cm) |
| 0 | 23 |
| 0.1 | 23 |
| 1.0 | 23 |
| 5.0 | 23 |

It is apparent from the above-mentioned three examples that "the surface tension is not so changed by the concentration." However, a surface tension in the above-described range can be obtained easily by adding another compatible solvent even though the surface tension is outside the range of 23 dyn/cm to 50 dyn/cm. It is recognized from results of the following measurements that the surface tension rapidly changes depending on the mixing ratio of different solvents.

DETAILED DESCRIPTION OF THE DRAWINGS

Figure 1:
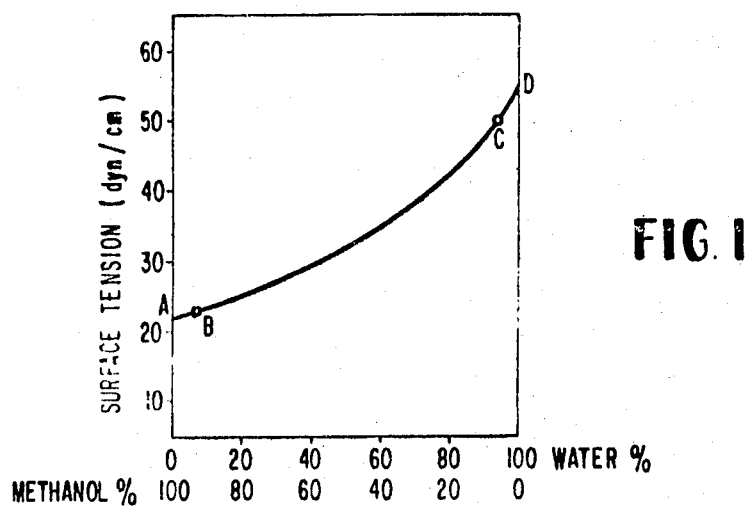
FIG. 1 is a curve drawn on the basis of values determined which shows the relationship between the surface tension (dyn/cm) of a gelatinous solution in a water-methanol solvent (gelatin content: 2 percent by weight) and the mixing ratio (percent by weight) of the water-methanol in the solution.
Figure 2:
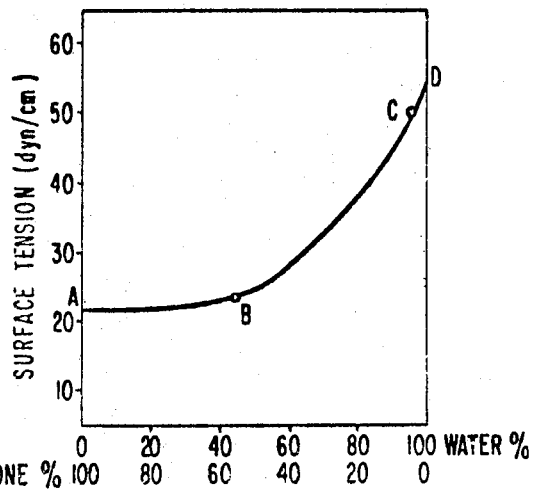
FIG. 2 is a curve which shows the relationship between the surface tension (dyn/cm) of a gelatinous solution in a water-acetone solvent (gelatin content: 2 percent by weight) and the mixing ratio (percent by weight) of the water and acetone.
Figure 3:
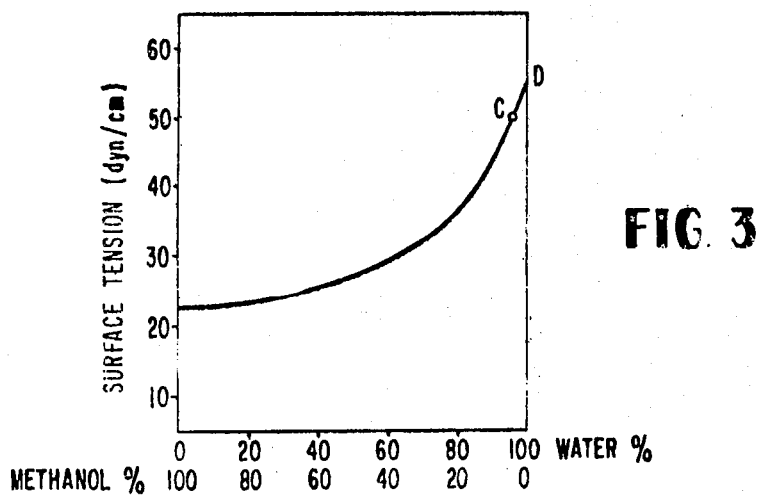
FIG. 3 is a curve which shows the relationship between the surface tension (dyn/cm) of a vinyl acetate-maleic anhydride copolymer in a water-methanol solvent (copolymer content: 1 percent by weight) and the mixing ratio (percent by weight) of the water and methanol.

As is clear from each figure, the surface tension changes markedly with respect to the mixing ratio of ingredients of the solvent. The mixing ratios of the solvents represented by the portions of the curves $\overline{AB}$ and $\overline{CD}$ in these figures cannot be used in this invention because of the poor stability of the solution and the poor wetting characteristics, respectively.

However, it is possible to make the solution suitable for subbing by changing the mixing ratio slightly. Accordingly, the mixing ratios corresponding to $\overline{AB}$ and $\overline{CD}$ should be avoided.

DETAILED DESCRIPTION OF THE INVENTION

In order to increase the efficiency of the activation on the surface of the polyethylene support by the ultraviolet irradiation, from 0.1 to 1.0 percent by weight of an anthraquinone type or benzophenone type sensitizer for ultraviolet radiation can be added to the polyethylene, or an organic solvent solution of these sensitizers can be applied to the surface of the polyethylene support.

Suitable anthraquinone type sensitizers are anthraquinone, 2-methylanthraquinone, 9,10-phenanthraquinone and 1,2-anthraquinone. Suitable benzophenone type sensitizers are benzophenone, 4-methyl-benzophenone and halogenated benzophenones, such as 4-chlorobenzo-phenone, 4-bromobenzophenone, 4,4'-dibromobenzophenone, 3-chloro-benzophenone and 3,3'-dichlorobenzophenone.

The support resulting from the use of the method of this invention has a long surface activity life before the application of photographic emulsions because of the protective function of the subbing layer applied, and the accumulation of electric charge is small in comparison with supports not having such a subbing layer.

The photographic light-sensitive material using the support prepared by this invention exhibited sufficient adhesive strength between the emulsion layer and the support during processing or in the dry condition before or after processing. Further, this excellent adhesive strength was not lost due to age.

Methods of examining the adhesion between the emulsion layer and the support are described in the following.

1. Examination of adhesion in a dry condition:

Checked scratches (interval of lines: approximately 4 mm) are drawn on the surface of the photographic emulsion layer using a razor. An adhesive tape having a good tackiness (for example, a polyester tape produced by the Nitto Electric Industrial Co., Ltd.) is applied to the surface of the emulsion layer and then is peeled off rapidly. Using this examining method, "good adhesion" means that more than 90 percent remains as the unpeeled part.

2. Examination of adhesion in processing solutions:

A scratch line is drawn on the surface of the emulsion layer in the processing solutions at each processing step using a steel pen. "Good adhesion" means that the emulsion layer does not peel further than the scratch line when the scratch line on the emulsion layer is rubbed at a rectangular direction to said scratch line by the tip of a finger.

EXAMPLE 1.

A subbing solution having the following composition was applied to a polyethylene coated paper which was prepared by applying polyethylene having a density of 0.92g/cm³ to both the surfaces of a photographic paper of 150g/m² by extrusion coating. The thickness of the coated polyethylene was approximately 30 microns.

| Subbing Solution Composition | |
|---|---|
| Gelatin | 10 g |
| Water | 100 cc |
| Methanol | 300 cc |
| Formalin | 0.2 cc |
| Surface Tension of the Subbing Solution | 25 dyn/cm |

(Measurement of surface tension was carried out by du Neüy's method as described above)

Within 10 seconds after the application of the subbing solution, ultraviolet radiation was applied to the undried coated surface for 1 minute using a 1kw cylindrical mercury lamp at a distance of 10cm from the coated surface. The temperature of the coated surface increased to 80°C during the application of the ultraviolet radiation. The support was then heated at 80°C for 5 minutes in an air oven.

The photographic light-sensitive material prepared by applying a gelatin-silver halide emulsion to the resulting support exhibited good adhesion between the emulsion layer and the support both during processing and in a dry condition before and after processing.

EXAMPLE 2.

A subbing solution having the following composition was applied to a polyethylene film of 130 microns in thickness and having a density of 0.96g/cm³. The film was then dried at 80°C for 2 minutes.

| Subbing Solution Composition | |
|---|---|
| Maleic Anhydride-Vinyl Acetate (1:1) Copolymer | 10 g |
| Methanol | 1000 cc |
| Chromium Acetate | 0.25 g |
| Surface Tension | 23 dyn/cm |

After drying, ultraviolet radiation was applied to the coated surface at 80°C for 1 minute using a 1 kw cylindrical mercury lamp at a distance of 10cm from the coated surface. The support was then heated at 100°C for 1 minute.

The photographic light-sensitive material prepared by applying a gelatin-silver halide emulsion to the resulting support exhibited sufficient adhesive strength between the emulsion layer and the support during processing or in a dry condition.

EXAMPLE 3.

A polyethylene having a density of 0.92g/cm³ was applied to both surfaces of a photographic paper of 150g/m² so as to form each polyethylene layer having approximately 30 microns in thickness by extrusion coating. A 0.5 percent solution of 2-methylanthraquinone in xylene was applied to one of the surfaces of the support and dried at 100°C for 2 minutes with hot air. Then a subbing solution having the following composition was applied to the above-described surface of the support. Within 10 seconds after the application of the subbing solution, ultraviolet radiation was applied for 30 seconds using the method as described in Example 1, followed by drying at 80°C for 10 minutes.

| Subbing Solution Composition | |
|---|---|
| Maleic Anhydride-Ethyl Acrylate (1:1) Copolymer | 5 g |
| Acetone | 1000 cc |
| Surface Tension | 24 dyn/cm |

The photographic light-sensitive material prepared by applying a silver halide emulsion to this resulting support showed good adhesion during processing and in a dry condition.

EXAMPLE 4.

A polyethylene coated paper was prepared as follows. One surface of the photographic paper of 150g/m² was coated with a polyethylene having a density of 0.92g/cm³ and the other surface of the photographic paper was coated with a polyethylene having a density of 0.92g/cm³, containing 0.1 percent (by weight) of 2-methylanthraquinone, by extrusion coating, respectively.

The thickness of the coated polyethylene was about 30 microns on each surface. A subbing solution having the following composition was applied to the surface of the support containing the 2-methylanthraquinone and then dried at 80°C for 3 minutes. After drying, ultraviolet radiation was applied for 30 seconds using the mercury lamp as described in Example 1, followed by heating at 100°C for 2 minutes.

| Subbing Solution Composition | |
|---|---|
| Gelatin | 10 g |
| Water | 100 cc |
| Acetone | 80 cc |
| Formalin | 0.2 cc |
| Surface Tension | 32 dyn/cm |

A gelatin-silver halide emulsion was applied to the resulting support and dried. Thus resetting photographic light-sensitive material had good adhesive strength during processing and in a dried condition.

EXAMPLE 5.

A subbing solution having the following composition was applied to a polyethylene film having a density of 0.96g/cm³ and of 100 microns in thickness in which 0.1 percent by weight of 9,10-phenanthraquinone was blended. Ultraviolet radiation was applied to the coated surface of the film in an undried state for 40 seconds using the mercury lamp as described in Example 1, followed by heating at 80°C for 5 minutes.

| Subbing Solution Composition | |
|---|---|
| Maleic Anhydride-Styrene (1:1) Copolymer | 10 g |
| Acetone | 750 cc |
| Methanol | 250 cc |
| Surface Tension | 23 dyn/cm |

The photographic light-sensitive material prepared by applying a gelatin silver halide photographic emulsion to the resulting support exhibited good adhesion between emulsion layer and support.

EXAMPLE 6.

The subbing solution having the following composition was applied to a polyethylene coated paper which was prepared by applying a polyethylene having a density of 0.95g/cm³ to one surface of the photographic paper of 150g/m² and applying a blend of the polyethylene having a density of 0.92 g/cm³ and 0.2 percent by weight of 4-bromobenzophenone to the other surface of the paper so as to form polyethylene layers having approximately 30 microns in thickness respectively by extrusion coating. Ultraviolet radiation was applied to the undried coated surface of the support for 30 seconds using the same procedure as in Example 1, followed by heating at 100°C for 1 minute.

| Subbing Solution Composition | |
|---|---|
| Maleic Anhydride-Vinyl Acetate (1:1) Copolymer | 25 g |
| Methanol | 1000 cc |
| Surface Tension | 23 dyn/cm |

The photographic light-sensitive material prepared by applying a gelatin-silver halide photographic emulsion to the thus resulting support exhibited good adhesion between the emulsion layer and the support.

EXAMPLE 7.

After applying and drying a solution of 0.1 percent by weight of 4-methylbenzophenone in xylene to an emulsion coating surface of a polyethylene film of 100 microns in thickness and having a density of 0.96g/cm³, a subbing solution having the following composition was applied to the surface of the film. Ultraviolet radiation was then applied to the coated surface in an undried state for 30 seconds using the same method as in Example 1, followed by heating at 80°C for 2 minutes.

| Subbing Solution Composition | |
|---|---|
| Maleic Anhydride-Styrene (1:1) Copolymer | 10 g |
| Acetone | 500 cc |
| Chromium Acetate | 0.25 g |
| Surface Tension | 24 dyn/cm |

The photographic light-sensitive material using the support obtained by this method showed good adhesion between the emulsion layer and the support during processing and in a dry condition.

EXAMPLE 8.

After applying and drying a solution of 0.5 percent by weight of benzophenone in xylene to the emulsion coating surface of a polyethylene film of 100 microns in thickness and having a density of 0.96g/cm³, a subbing solution having the following composition was applied to the film. Ultraviolet radiation was then applied to the coated surface in an undried state for 30 seconds using the same method as described in Example 1, followed by heating at 80°C for 2 minutes.

| Subbing Solution Composition | |
|---|---|
| Gelatin | 10 g |
| Water | 80 cc |
| Methanol | 120 cc |
| Acetone | 50 cc |
| Formalin | 0.3 cc |
| Surface Tension | 27 dyn/cm |

The photographic light-sensitive material prepared by applying a gelatin-silver halide emulsion to the thus resulting support exhibited sufficient adhesive strength both during processing and in a dry condition.

EXAMPLE 9.

A subbing solution having the following composition was applied to a polyethylene film of 100 microns in thickness and having a density of 0.96 g/cm³. 0.5 percent by weight of anthraquinone was included in the polyethylene film. After drying the coated layer at 80°C for 5 minutes, ultraviolet radiation was applied for 1 minute using the mercury lamp as described in Example 1.

| Subbing Solution Composition | |
|---|---|
| Gelatin | 20 g |
| Water | 1000 cc |
| Emalex NP-5(Nippon Emulsion Co.)* | 0.05 g |
| Surface Tension | 42 dyn/cm |

*Nonionic surfactant - aqueous 1% by weight solution of polyoxyethylene nonylphenylether.

The photographic light-sensitive material prepared by applying a silver halide emulsion to the thus resulting support exhibited good adhesive strength during processing and in a dried condition.

EXAMPLE 10

After applying and drying a solution of 0.5 percent by weight of 4,4'-chlorobenzophenone in xylene, the emulsion coating surface of a polyethylene coated paper which was prepared by applying a polyethylene having a density of 0.92 g/cm³ to both surfaces of the photographic paper of 100 g/m² so as to form polyethylene layers approximately 40 microns in thickness by extrusion coating. A subbing solution having the following composition was applied to the emulsion coating surface. Ultraviolet radiation was then applied in an undried state for 30 seconds using the same method as in Example 1, followed by drying at 80°C for 3 minutes.

| Subbing Solution Composition | |
|---|---|
| Gelatin | 10 g |
| Glacial Acetic Acid | 12 cc |
| Nitrocellulose | 1 g |
| Methanol | 200 cc |
| Acetone | 400 cc |
| Surface Tension | 24 dyn/cm |

The photographic light-sensitive material prepared by applying a gelatin-silver halide photographic emulsion to the resulting support exhibited good adhesion between the emulsion layer and the support during processing and in a dried condition.

What is claimed is:

1. A method for applying a subbing layer to a support for a photographic light-sensitive material with improved adhesion between said support and said subbing layer comprising applying a subbing solution to a surface of a support adapted to be coated with a light-sensitive emulsion to provide a photographic light-sensitive material, said support being selected from the group consisting of a polyethylene film and a polyethylene coated paper, said subbing solution being a solution or a dispersion of a member selected from the group consisting of a gelatin and a maleic anhydride copolymer and having a surface tension at 35°C ranging from 23 dyn/cm to 50 dyn/cm and thereafter irradiating the thus prepared surface with ultraviolet radiation.

2. The method of claim 1, wherein said maleic anhydride copolymer is a copolymer of maleic anhydride with a monomer selected from the group consisting of ethyl acrylate, methacrylamide, vinyl acetate, vinyl propionate, vinyl benzoate, vinyl methyl ether, vinyl butyl ether, styrene and ethylene dichloride.

3. The method of claim 2, wherein said copolymers have a molecular weight ranging from 8,000 to 1,000,000.

4. The method of claim 2, wherein the molar ratio of maleic anhydride to monomer is about 1:1.

5. The method of claim 1, wherein from 0.1 to 1.0 percent by weight of an ultraviolet sensitizer is present additionally on the surface of said photographic light-sensitive emulsion coating surface prior to applying the ultraviolet irradiation.

6. The method of claim 5, wherein said sensitizer is a member selected from the group consisting of an anthraquinone sensitizer and a benzoquinone sensitizer.

7. A method according to claim 6 wherein said sensitizer is an anthraquinone sensitizer selected from the group consisting of anthraquinone, 2-methylanthraquinone, 10-phenanthraquinone, and 1,2-anthraquinone.

8. A method according to claim 6 wherein said sensitizer is a benzophenone sensitizer selected from the group consisting of benzophenone, 4-methylbenzophenone, and halogenated benzophenones.

9. A method according to claim 8 wherein said halogenated benzophenone is selected from the group consisting of 4-chlorobenzophenone, 4-bromobenzophenone, 4,4'-dibromobenzophenone, 3-chlorobenzophenone, and 3,3'dichlorobenzophenone.

10. A method for applying a subbing layer to a support for a photographic light-sensitive material with improved adhesion between said support and said subbing layer comprising applying a subbing solution to a surface of a support adapted to be coated with a light-sensitive emulsion to provide a photographic light-sensitive material, said support being selected from the group consisting of a polyethylene film and a polyethylene coated paper, said subbing solution consisting essentially of a solution or dispersion of a maleic anhydride copolymer and having a surface tension at 35°C ranging from 23 dyn/cm to 50 dyn/cm and thereafter irradiating the thus prepared surface with ultraviolet radiation.

11. A method for applying a subbing layer to a support for a photographic light-sensitive material with improved adhesion between said support and said subbing layer comprising applying a subbing solution to a surface of a support adapted to be coated with a light-sensitive emulsion to provide a photographic light-sensitive material, said support being selected from the group consisting of a polyethylene film and a polyethylene coated paper, said subbing solution consisting essentially of a solution or dispersion of a gelatin having a surface tension at 35°C ranging from 23 dyn/cm to 50 dyn/cm and thereafter irradiating the thus prepared surface with ultraviolet radiation.

12. A method according to claim 10 wherein said maleic anhydride copolymer is a copolymer of maleic anhydride with a monomer selected from the group consisting of ethyl acrylate, methacrylamide, vinyl acetate, vinyl propionate, vinyl benzoate, vinyl methyl ether, vinyl butyl ether, styrene and ethylene dichloride.

13. In a method for preparing a support of a photographic light-sensitive material comprising applying a subbing layer to a surface of said support to increase the adhesion of a subsequently applied photographic light-sensitive emulsion layer to said surface of said support, the improvement comprising obtaining improved adhesion between said subbing layer and said surface of said support by:
applying a subbing solution consisting essentially of a solution or a dispersion of a member selected from the group consisting of a gelatin and a maleic anhydride copolymer having a surface tension at 35°C ranging from 23 to 50 dynes/cm to said surface of a non-irradiated support consisting essentially of polyethylene or polyethylene-coated paper; and
thereafter irradiating the thus-coated surface with ultraviolet radiation.

14. The method of claim 13 wherein said irradiating step is conducted for a period of time of less than 1 minute.

15. The subbed photographic support produced by the method of claim 13.

* * * * *